(12) United States Patent
Ku et al.

(10) Patent No.: US 9,246,186 B2
(45) Date of Patent: Jan. 26, 2016

(54) ELECTRODE ASSEMBLY, FABRICATING METHOD OF THE ELECTRODE ASSEMBLY AND ELECTROCHEMICAL CELL CONTAINING THE ELECTRODE ASSEMBLY

(71) Applicant: LG CHEM. LTD., Seoul (KR)

(72) Inventors: Dae Geun Ku, Daejeon (KR); Hyuk Su Kim, Daejeon (KR); Jun Woo Huh, Daejeon (KR); Hyang Mok Lee, Daejeon (KR); Chang Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/175,361

(22) Filed: Feb. 7, 2014

(65) Prior Publication Data

US 2014/0154565 A1    Jun. 5, 2014

Related U.S. Application Data

(63) Continuation of application No. PCT/KR2013/005772, filed on Jun. 28, 2013.

(30) Foreign Application Priority Data

Jun. 28, 2012   (KR) ................. 10-2012-0069833
Jun. 27, 2013   (KR) ................. 10-2013-0074676

(51) Int. Cl.
*H01M 4/02*        (2006.01)
*H01M 10/04*       (2006.01)
(Continued)

(52) U.S. Cl.
CPC .......... *H01M 10/0431* (2013.01); *B32B 37/02* (2013.01); *H01M 2/168* (2013.01); *H01M 10/0468* (2013.01); *H01M 10/0585* (2013.01); *B32B 2457/10* (2013.01)

(58) Field of Classification Search
CPC .............. B32B 2457/10; B32B 37/02; H01M 10/0431; H01M 10/0468; H01M 10/0585; H01M 2/168
See application file for complete search history.

(56) References Cited

U.S. PATENT DOCUMENTS

2002/0160257 A1   10/2002   Lee et al.
2002/0160258 A1   10/2002   Lee et al.
(Continued)

FOREIGN PATENT DOCUMENTS

CN    101796684 A    8/2010
JP    2000-311717 A   11/2000
(Continued)

OTHER PUBLICATIONS

International Search Report issued in PCT/KR2013/005772, mailed on Oct. 24, 2013.
(Continued)

*Primary Examiner* — Patrick Ryan
*Assistant Examiner* — Ben Lewis
(74) *Attorney, Agent, or Firm* — Birch, Stewart Kolasch & Birch, LLP

(57) ABSTRACT

A fabricating method of a unit structure for accomplishing an electrode assembly formed by a stacking method, and an electrochemical cell including the same are disclosed. The fabricating method of the electrode assembly is characterized with fabricating the unit structure by conducting a first process of laminating and forming a bicell having a first electrode/separator/second electrode/separator/first electrode structure, and conducting a second process of laminating first separator/second electrode/second separator one by one on one of the first electrode among two of the first electrodes.

10 Claims, 4 Drawing Sheets

(51) Int. Cl.
*B32B 37/02* (2006.01)
*H01M 10/0585* (2010.01)
*H01M 2/16* (2006.01)

(56) References Cited

U.S. PATENT DOCUMENTS

| | | |
|---|---|---|
| 2003/0037431 A1* | 2/2003 | Benson et al. ............... 29/623.1 |
| 2003/0104273 A1 | 6/2003 | Lee et al. |
| 2009/0325057 A1 | 12/2009 | Kim et al. |
| 2010/0190081 A1* | 7/2010 | Park et al. .................... 429/452 |
| 2010/0279161 A1 | 11/2010 | Kang et al. |
| 2011/0052964 A1 | 3/2011 | Kim et al. |
| 2011/0171521 A1 | 7/2011 | Sohn |
| 2012/0121964 A1 | 5/2012 | Park et al. |
| 2012/0225345 A1 | 9/2012 | Kim |
| 2013/0260211 A1 | 10/2013 | Min et al. |

FOREIGN PATENT DOCUMENTS

| | | |
|---|---|---|
| JP | 2003-331813 A | 11/2003 |
| JP | 2009-540523 A | 11/2009 |
| JP | 2010-080324 A | 4/2010 |
| KR | 2001-0045056 A | 6/2001 |
| KR | 2001-0082059 A | 8/2001 |
| KR | 2001-0082060 A | 8/2001 |
| KR | 2002-0071204 A | 9/2002 |
| KR | 10-2007-0108084 A | 11/2007 |
| KR | 10-2007-0118715 A | 12/2007 |
| KR | 10-2011-0082745 A | 7/2011 |
| KR | 10-2011-0112241 A | 9/2012 |
| WO | WO 2011/126310 A2 | 10/2011 |
| WO | WO 2012/074219 A2 | 6/2012 |

OTHER PUBLICATIONS

Chinese Office Action, Search Report and English translation thereof dated Sep. 25, 2015 for Application No. 201380002933.8.
Supplementary European Search Report dated Oct. 30, 2015.

* cited by examiner (a)

(b)

(a)

(b)

ELECTRODE ASSEMBLY, FABRICATING METHOD OF THE ELECTRODE ASSEMBLY AND ELECTROCHEMICAL CELL CONTAINING THE ELECTRODE ASSEMBLY

CROSS-REFERENCE TO RELATED APPLICATIONS

This application is a Bypass Continuation of PCT International Application No. PCT/KR2013/005772 filed on Jun. 28, 2013, which claims priority under 35 U.S.C §119(a) to Korean Patent Application Nos. 10-2012-0069833 filed on Jun. 28, 2012, and 10-2013-0074676 filed on Jun. 27, 2013, in the Korean Intellectual Property Office, the disclosures of which are incorporated herein by references.

BACKGROUND OF THE INVENTION

1. Field of the Invention

The present invention relates to a fabricating method of a unit structure materializing an electrode assembly fabricated by a stacking method other than a folding method, a fabricating method of the electrode assembly and an electrochemical cell including the electrode assembly.

2. Description of the Related Art

A secondary battery attracts attention as a power source of an electric vehicle (EV), a hybrid electric vehicle (HEV), a parallel hybrid electric vehicle (PHEV), and the like, which have been suggested as alternatives for solving defects such as environmental contamination due to commonly used gasoline vehicles, diesel vehicles, and the like using fossil fuels. In a medium and large size device such as automobiles, a medium and large size battery module in which a plurality of battery cells is electrically connected is used due to the need of high power and high capacity.

However, since the medium and large size battery module is necessary to be manufactured so as to have a small size and a light weight, a square shape battery, a pouch shape battery, and the like, which may be stacked in a high degree and have a light weight when compared with the capacity, are widely used as the battery cells of the medium and large size battery module.

In the case of the battery cell, an electrode assembly is included. Generally, the electrode assembly is classified according to the structure of the electrode assembly including a cathode/separator/anode structure.

Typically, the electrode assembly may be classified into a jelly-roll (a wrapping type) electrode assembly, in which cathodes and anodes having long sheet shapes along with an interposed separator are wrapped, a stack type (a laminated type) electrode assembly, in which a plurality of cathodes and anodes along with interposed separators, which are cut into specific size units, are stacked one by one, and a stack/folding type electrode assembly.

First, the stack/folding type electrode assembly disclosed in Korean Patent Application Publication Nos. 2001-0082059 and 2001-0082060 filed by the present Applicant will be explained.

Referring to FIG. 1, an electrode assembly 1 of a stack/folding structure includes a plurality of overlapped full cells 2, 3, 4 .... (Hereinafter, will be referred to as full cell) as unit cells, in which cathode/separator/anode are positioned one by one. In each of the overlapped parts, a separator sheet 5 is interposed. The separator sheet 5 has a unit length possibly wrapping the full cells. The separator sheet 5 initiated from the central full cell 1b is bent inward by the unit length while continuously wrapping each of the full cells to the outermost full cell 4 so as to be interposed in the overlapped parts of the full cells. The distal portion of the separator sheet 5 is finished by conducting heat welding or attaching using an adhesion tape 6. The stack/folding type electrode assembly is manufactured by, for example, arranging the full cells 2, 3, 4 ... on the separator sheet 5 having a long length and wrapping from one distal portion of the separator sheet 5 in sequence. However, in this structure, a temperature gradient may be generated between the electrode assemblies 1a, 1b and 2 in the center portion and the electrode assemblies 3 and 4 disposed at the outer portion to produce different heat emitting efficiency. Thus, the lifetime of the electrode assembly may be decreased when used for a long time.

The manufacturing process of the electrode assembly is conducted by using two lamination apparatuses for manufacturing each electrode assembly and one additional folding apparatus as a separate apparatus. Therefore, the decrease of the tack time of the manufacturing process has a limitation. Particularly, the minute aligning of the electrode assemblies disposed up and down is difficult in the structure accomplishing the stacked structure through the folding. Thus, the manufacture of an assembly having a reliable quality is very difficult.

FIG. 2 illustrates A type and C type bicell structures which are unit structures applicable instead of the full cell in the electrode assembly of the above-described stack/folding type structure in FIG. 1. At the center portion of the electrode assembly of the stack/folding structure, which is the initiating point of wrapping, a bicell ('A-type bicell') having (a) a cathode/separator/anode/separator/cathode structure or a bicell ('C-type bicell') having (b) an anode/separator/cathode/separator/anode structure, wrapped with a separator sheet may be disposed.

That is, the common bicell may have a structure of the 'A-type bicell' having a stacked structure of a double side cathode 10, a separator 20, a double side anode 30, a separator 40 and a double side cathode 50 one by one as illustrated in FIG. 2(a), or the 'C-type bicell' having a stacked structure of a double side anode 30, a separator 20, a double side cathode 10, a separator 40 and a double side anode 60 one by one as illustrated in FIG. 2(b).

In the electrode assembly structure fabricated by applying the folding process, a folding apparatus may be separately necessary. When applying the bicell structure, the bicells may be fabricated by two types (that is, A-type and C-type) and stacked. Before conducting the folding, the keeping of accurate distance between the bicells disposed on a long separator sheet may be very difficult. That is, when conducting the folding, the accurate alignment of upper and lower unit cells (meaning the full cells or the bicells) may be difficult. In addition, when manufacturing a high capacity cell, a considerable time may be necessary for changing the types.

PRIOR ART DOCUMENTS

Patent Documents (Patent Document 1) Korean Publication Patent No. 2001-0045056

(Patent Document 2) Korean Publication Patent No. 2011-0082745

SUMMARY OF THE INVENTION

An aspect of the present invention considering the above-described defects provides a fabricating method of an electrode assembly and a structure of an electrode assembly by which the fabricating method of a medium and large size lithium ion polymer battery may be simplified and unified through fabricating one kind of unit structure, deviated from the common fabricating method of an electrode assembly in which two types (A-type and C-type) of bicells are necessary to be fabricated, investment on facility may be decreased, and productivity may be increased.

Another aspect of the present invention provides a fabricating method of a unit structure having a novel structure by using a lamination apparatus for fabricating a common A-type bicell and a lamination apparatus for fabricating a C-type bicell, and utilizing common A-type bicell and C-type bicell as they are without abrogation.

According to an aspect of the present invention, there is provided a fabricating method of an electrode assembly in which a unit structure of the electrode assembly is formed by conducting a first process of laminating and forming a bicell having a first electrode/separator/second electrode/separator/first electrode structure, and conducting a second process of laminating first separator/second electrode/second separator one by one on one of the first electrode among two of the first electrodes.

According to another aspect of the present invention, there is provided an electrode assembly fabricated by using the unit structure formed through the above-described processes, and a secondary battery and a medium and large size battery module is manufactured by using the electrode assembly.

According to the present invention, a fabricating method by which a medium and large size lithium ion polymer battery may be simplified and unified through fabricating one kind of unit structure, investment on facility may be decreased, and productivity may be increased, and the structure of an electrode assembly may be provided.

In addition, the lamination apparatus for fabricating a common A-type bicell and the lamination apparatus for fabricating a common C-type bicell may be used as they are, and the common A-type bicell or the C-type bicell may be used as they are without abrogation for fabricating a unit cell having a new structure.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. In explaining the accompanying drawings, the same reference symbols may be designated to the same elements, and duplicating explanation thereon may be omitted. Although the terms first, second, etc. maybe used herein to describe various elements, these elements, should not be limited by these terms. These terms are only used to distinguish one element from another element.

The core technology of the fabricating process of an electrode assembly in accordance with the present inventive concept is the forming of a unit structure. Particularly, the unit structure may be formed by conducting a first process of laminating and forming a bicell having a first electrode/separator/second electrode/separator/first electrode structure, and by conducting a second process of laminating first separator/second electrode/second separator one by one on one of the first electrode among the two of the first electrodes included in the bicell formed by the first process.

Here, the first electrode/second electrode may be anode/cathode or cathode/anode. However, for the convenience of explanation, for example, the first electrode is considered as an anode, and the second electrode is considered as a cathode herein below.

Figure 3:
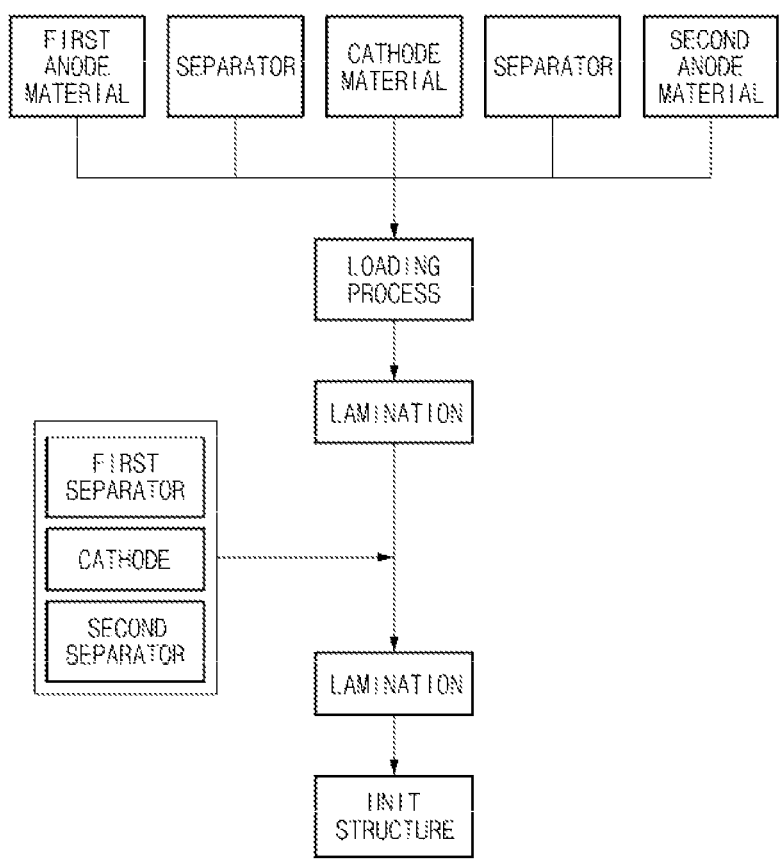
FIG. 3 is a block diagram illustrating a fabricating process of a unit structure included in an electrode assembly in accordance with an example embodiment.

Referring to FIG. 3, the unit structure of the above described structure may be fabricated by stacking a first anode material, a separator, a cathode material, a separator and a second anode material one by one, loading the stacked structure on a laminator, and laminating to fabricate a bicell (C-type bicell) having a first anode/separator/cathode/separator/second anode structure (the first process).

Then, the second process of laminating the first separator/cathode/second separator on the first anode or the second anode of the C-type bicell may be conducted.

Figure 4:
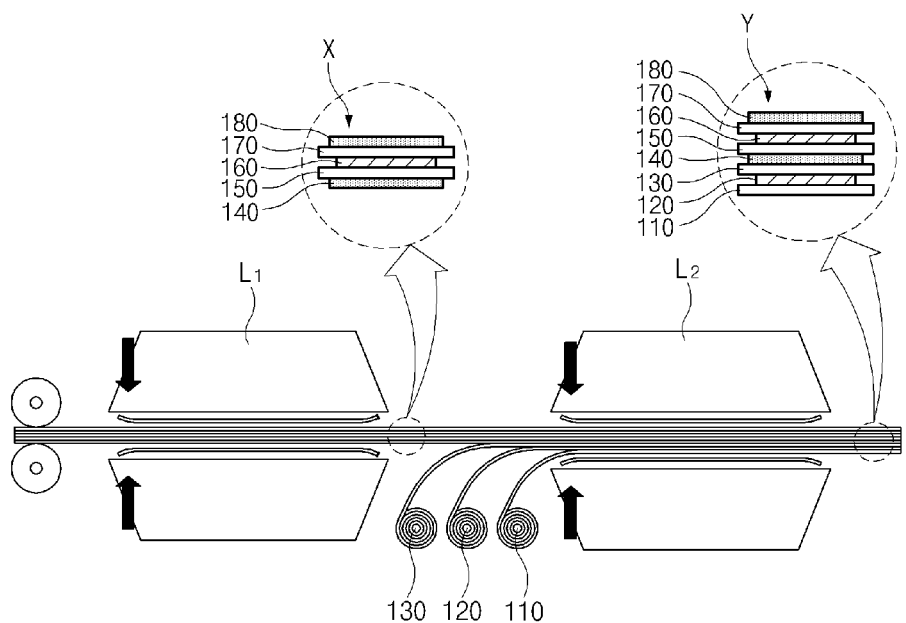
FIG. 4 is a schematic diagram for illustrating a fabricating process of a unit structure by using a fabricating apparatus for manufacturing the unit structure in FIG. 3.

FIG. 4 illustrates a fabricating process conducted in a practical fabricating apparatus for showing the fabricating process of the unit assembly conceptually illustrated as the block diagram (FIG. 3).

As illustrated in FIG. 4, a first laminator L1 and a second laminator L2 may be disposed on one fabricating line along the proceeding direction of a C-type bicell so as to continuously accomplish the first process and the second process. In the first laminator L1, the first anode material, the first separator, the cathode material, the separator, and the second anode material may be loaded one by one, stacked and then laminated. Here, the loading means supplying base material (that is, the first anode material, the separator, the cathode material, the second anode material), which is the material of each component, into the laminator. The base materials may be supplied to the first laminator L1 through a loading unit (loading roll) at the same time, and the supplied base materials may be stacked by an order of first anode 140/separator 150/cathode 160/separator 170/second anode 180 by the first laminator L1 one by one (see 'X' in FIG. 4).

Then, first separator 130/cathode 120/second separator 110 are laminated by the second laminator L2 while being supplied on the first anode 140 to form a unit structure.

In FIG. 4, an example embodiment of supplying all of the first separator, the cathode and the second separator as a roll shape into the second laminator L2 is illustrated. However, an example of supplying a sheet shape other than the roll shape may be postulated.

Meanwhile, the surface of the separators 110, 130, 150 and 170 may be coated by using a coating material having adhesiveness. In this case, the coating material may be a mixture of inorganic particles and a binder polymer. Here, the inorganic particles may improve the thermal stability of the separators 110, 130, 150 and 170. That is, the inorganic particles may prevent the contraction of the separators 110, 130, 150 and 170 at a high temperature. In addition, the binder polymer may fix the inorganic particles. Thus, the inorganic particles may have a certain porous structure. Due to the porous structure, ions may smoothly move from the cathode to the anode, even though the inorganic particles may be coated on the separators 110, 130, 150 and 170. In addition, the mechanical stability of the separators 110, 130, 150 and 170 may be improved because the binder polymer may stably keep the inorganic particles onto the separators 110, 130, 150 and 170. Further, the binder polymer may attach the separator onto the electrode more stably. The coating of the separator accomplished by the above-described method is called a safety reinforced separator (SRS) coating.

Figure 1:
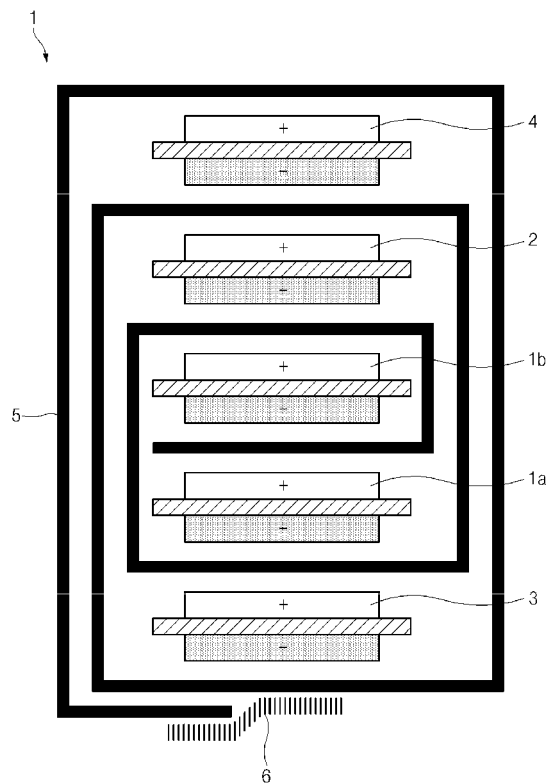
FIG. 1 is a conceptual diagram illustrating a folding structure of a common stack/folding type electrode assembly.
Figure 2:
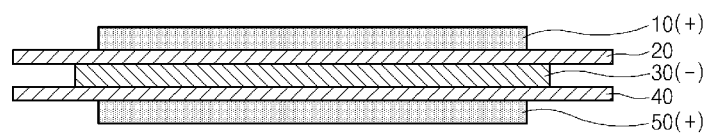
FIG. 2 illustrates cross-sectional views of an A-type bicell and a C-type bicell applied instead of a full cell in the stack/folding type electrode assembly in FIG. 1.
Figure 2:
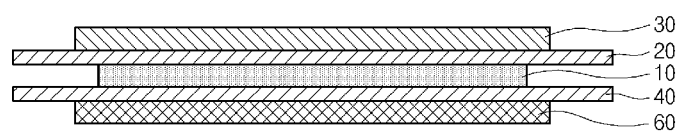

When referring to the fabricated state of the unit structure, the electrodes 120 and 140 are positioned on both sides of the first separator 130, however, only one electrode 120 is positioned on one side of the second separator 110. Thus, a coating material having adhesiveness may be coated on both sides of the first separator 130, and the coating material may be coated only on one side of the second separator 110 facing the electrode. Accordingly, the fabricating cost of the unit structure may be decreased. In addition, since the electrodes are exposed at both sides of the bicell for the bicell illustrated in FIG. 2, two vision inspecting apparatuses are necessary. However, for the unit structure in accordance with exemplary embodiments, the electrode is not disposed on one side among the two sides of the second separator 110. Thus, the vision inspecting apparatus may be installed near the electrode disposed at the opposite portion of the second separator of the unit structure. Therefore, the cost of the apparatus may be decreased.

For reference, when a coating material having adhesiveness is coated on the separators 110, 130, 150 and 170, the application of a direct pressure onto the separators 110, 130, 150 and 170 by using a certain object may not be desirable. The separators 110, 130, 150 and 170 may be commonly extended outwardly from the electrode. Thus, an attempt may be made to weld the edge portions of the separators 110, 130, 150 and 170 to each other through, for example, sonication welding. However, according to the sonication welding, the direct pressurization of a target object by using an apparatus named a horn is necessary. When the edge portion of the separators 110, 130, 150 and 170 is directly pressurized by using the apparatus named horn, the horn may attach to the separator due to the coating material having the adhesiveness. In this case, the apparatus may be out of order. Thus, when the coating material having the adhesiveness is coated on the separators 110, 130, 150 and 170, a process of directly applying the pressure onto the separators 110, 130, 150 and 170 by using a certain object may not be desirable.

The temperature applied for the laminating in the second process may be lower by about 20° C. to 50° C. than the temperature applied for the laminating in the first process. The pressure applied for the laminating in the second process may be about 40% to 60% of the pressure applied for the laminating in the first process. As described above, by differentiating the temperature and the pressure at the second process from the first process, the processing conditions may be simplified, and the cost necessary for conducting the process may be decreased.

In addition, the temperature applied to an upper block and a lower block may be different for the second laminator L2 for conducting the second process.

For example, unnecessary power consumption may be decreased by keeping the temperature of the lower block of the second laminator L2 contacting the first separator/cathode/second separator (accurately, contacting the second separator), which may be laminated in the C-type bicell by the second process, higher by about 10° C. to 30° C. than the upper block of the second laminator L2 contacting the second anode 180 of the C-type bicell formed by the first process.

When an electrode assembly is fabricated by using a common bicell, a line equipment for fabricating an A-type bicell and a line equipment for fabricating a C-type bicell are necessary to be installed respectively, and two kinds of the bicells are necessary to be stacked. On the contrary, the unit structure having the same structure may be fabricated by using only one bicell among the A-type bicell and the C-type bicell in accordance with exemplary embodiments. An electrode assembly may be obtained from at least one of the unit structure or by stacking a plurality of the unit structures. Thus, the first process may be conducted by using only one line equipment among the line equipment for fabricating the A-type bicell and the line equipment for fabricating the C-type bicell. By attaching an equipment for conducting the second process onto the line equipment, the unit structure may be manufactured thorough continuous process.

Figure 5:
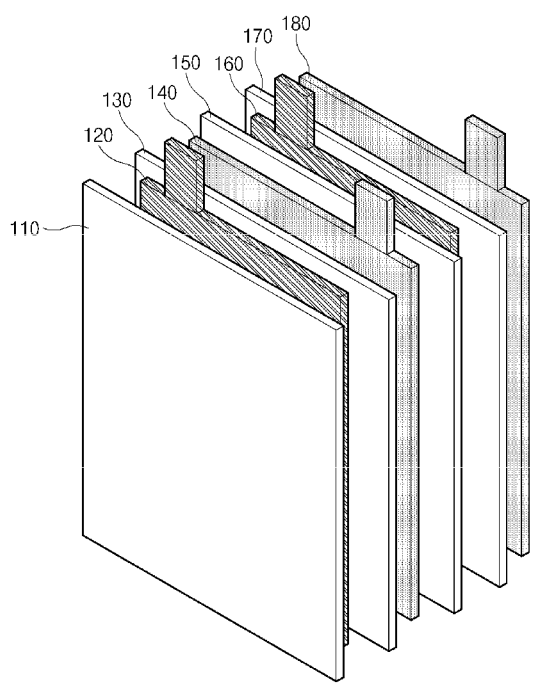
FIG. 5 is an exploded perspective view of a unit structure in accordance with an example embodiment.
Figure 6:
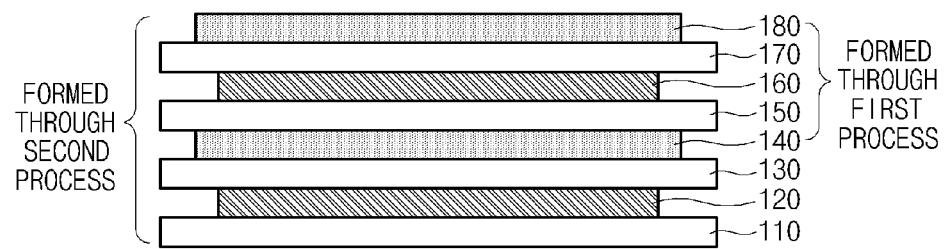
FIG. 6 is a cross-sectional view of a unit structure in accordance with an example embodiment.

FIG. 5 is an exploded perspective view of a unit structure in accordance with an example embodiment, and FIG. 6 is a cross-sectional view of a unit structure in accordance with an example embodiment. The unit structure may be fabricated by using the C-type bicell or the A-type bicell as described above. For example, when the unit structure is fabricated by using the C-type bicell, the unit structure having the structure illustrated in FIG. 6 may be fabricated by conducting a first process of forming a C-type bicell having a first anode 140/separator 150/cathode 160/separator 170/second anode 180 structure, and conducting a second process of laminating the first separator 130/cathode 120/second separator 110 one by one on the first anode 140 of the C-type bicell.

Through fabricating the electrode assembly by using the unit structure having the above-described structure, the fabricating process of a medium and large size lithium ion polymer battery may be simplified and unified. In addition, investment on equipment may be decreased, and productivity may be increased. Further, the secondary battery may be obtained only by applying the stacking process other than the commonly applied folding process, and so, the manufacturing process may be simplified, and the production cost may be extremely decreased.

Figure 7:
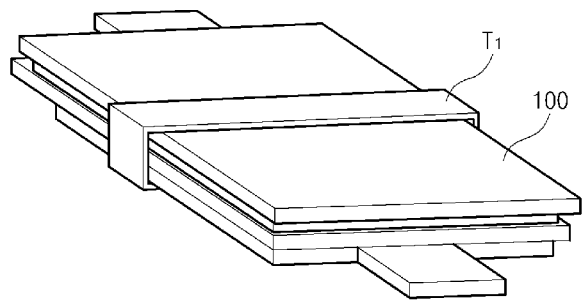
FIG. 7 illustrates electrode assemblies including fixing members for fixing the electrode assemblies in accordance with example embodiments.
Figure 7:
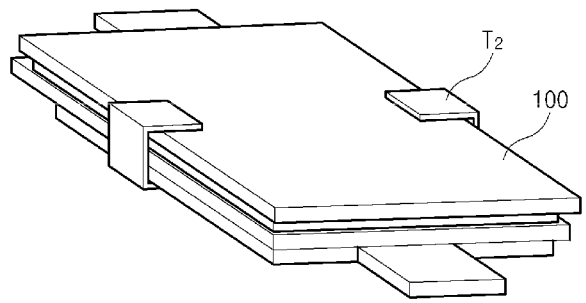

FIG. 7 illustrates fixing members for fixing an electrode assembly in accordance with exemplary embodiments.

That is, the electrode assembly in accordance with exemplary embodiments may further include a fixing member T1 for fixing the side or the perimeter of the unit structure itself, or for fixing the side or the perimeter of the electrode assembly 100 formed by stacking a plurality of the unit structures.

In order to confirm the stability of the stacking of the simply stacked structure, the fixing may be conducted by using a separate element at the side of the stacked structure. This fixing part may be applied by taping the perimeter of the stacked electrode assembly as illustrated in FIG. 7(a), or by applying a fixing member T2 for fixing only the side of the electrode assembly as illustrated in FIG. 7(b). In addition, the material of the fixing part may be selected from a different material of the separator.

Of course, the fixing of the electrode assembly may be accomplished by welding the distal portion of the separator extruded toward the side of the unit structure or the stacked electrode assembly other than using a separate fixing part. The separator may be formed by using at least one selected from the group consisting of a polyethylene film, a polypropylene film, a multi-layered film obtained by combining the films, a polymer film for a polymer electrolyte of polyvinylidene fluoride, polyethylene oxide, polyacrylonitrile, or a copolymer of polyvinylidene fluoride hexafluoropropylene with fine pore.

Hereinafter, particular materials and constitutional features of constituent elements of the electrode assembly according to the present invention will be explained.

[Cathode Structure]

An electrode provided in a radical cell is classified into a cathode and an anode and radical cell is manufactured by combining the cathode and the anode along with a separator interposed therebetween. The cathode may be manufactured, for example, by coating slurry of a mixture of a cathode active material, a conductive material and a binder on a cathode current collector, drying and pressing. A filler may be added into the mixture as occasion demands. When the cathode is accomplished as a sheet shape to be installed on a roll, the manufacturing rate of the radical cell may be increased.

[Cathode Current Collector]

A cathode current collector is generally manufactured to a thickness of about 3 to 500 μm. For the cathode current collector, a material not inducing the chemical change of a battery and having a high conductivity may be used without limitation. For example, stainless steel, aluminum, nickel, titanium, clacined carbon, a surface treated material of aluminum or stainless steel with carbon, nickel, titanium, silver, or the like may be used. The adhesiveness of a cathode active material may be increased by forming minute embossing on the surface of the cathode current collector. The cathode current collector may have various shapes such as a film, a sheet, a foil, a net, a porous material, a foamed material, a non-woven material, and the like.

[Cathode Active Material]

A cathode active material for a lithium secondary battery may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (in which x is 0 to 0.33), $LiMnO_3$, $LirMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site-type lithium nickel oxide represented by Chemical Formula of $LiNi_{1-x}M_xO_2$ (in which, M=Co, Mn, Al, Cu, Fe, Mg, B or Ga, x=0.01 to 0.3); lithium manganese complex oxide represented by Chemical Formulae $LiMn_{2-x}M_xO_2$ (in which M=Co, Ni, Fe, Cr, Zn or Ta, and x=0.01 to 0.1) or $Li_2Mn_3MO_8$ (in which, M=Fe, Co, Ni, Cu or Zn); $LiMn_2O_4$ in which a portion of Li is substituted with alkaline earth ions; a disulfide compound; $Fe_2(MoO_4)_3$, and the like, without limitation.

Generally, a conductive material is added into a mixture including the cathode active material by 1 to 50 wt % based on the total amount of the mixture. Any conductive material having conductivity without inducing the chemical change of a battery may be used without limitation. For example, graphite such as natural graphite, synthetic graphite, etc.; carbon black such as carbon black, acetylene black, ketjen black, channel black, furnace black, lamp black, thermal black, etc.; conductive fiber such as carbon fiber, metal fiber, etc.; a metal powder such as a carbon fluoride powder, an aluminum powder, a nickel powder, etc.; conductive whisker such as potassium titanate, etc.; conductive metal oxide such as titanium oxide, etc.; a conductive material such as polyphenylene derivatives, etc. may be used A binder is a component assisting the bonding of the active material with the conductive material and the bonding with the current collector, and is commonly included by about 1 to 50 wt % based on the total amount of the mixture including the cathode active material. Examples of the binder may include polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethyl ene-propylene-diene polymer (EPDM), sulfonated EPDM, styrene butadiene rubber, fluorine rubber, various copolymers, etc.

A filler is a component restraining the expansion of the cathode and is selectively used. A material not inducing the chemical change of a battery and having a fiber phase may be used without limitation. For example, olefin-based polymer such as polyethylene, polypropylene, and the like; fiber phase material such as glass fiber, carbon fiber, and the like may be used.

[Anode Structure]

An anode may be manufactured by coating an anode active material on an anode current collector, drying and pressing. A conductive material, a binder, a filler, etc. may be selectively included as occasion demands. When the anode is formed as a sheet shape possibly installed on a roll, the manufacturing rate of a radical cell may be increased.

[Anode Current Collector]

An anode current collector is generally manufactured to a thickness of about 3 to 500 μm. For the anode current collector, a material not inducing the chemical change of a battery and having conductivity may be used without limitation. For example, copper, stainless steel, aluminum, nickel, titanium, clacined carbon, a surface treated material of copper or stainless steel with carbon, nickel, titanium, silver, an aluminum-cadmium alloy, etc. may be used. Also, as for the cathode current collector, the adhesiveness of the anode active material may be increased by forming minute embossing on the surface of the anode current collector. The anode current collector may have various shapes such as a film, a sheet, a foil, a net, a porous material, a foamed material, a non-woven material, etc.

[Anode Active Material]

An anode active material may include, for example, carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 \leq x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, etc.

[Separator]

A separator forms a radical cell through conducting a simple stacking process apart from a folding process or a roll process to accomplish the simple stacking. Particularly, the attachment of the separator and the electrode may be accomplished by pressure (or by pressure and heat) in a laminator. From the above-described process, a stable interface contact between the electrode and the separator sheet may become possible.

Any material may be used for the manufacture of the separator, that may exhibit insulating properties and have a porous structure for the movement of ions. For example, an insulating thin film having a high ion transmittance and mechanical strength may be used. The pore diameter of the separator or the separator sheet is commonly about 0.01 to 10 μm, and the thickness thereof is commonly about 5 to 300 μm.

As for the separator, for example, an olefin-based polymer such as chemical-resistant and hydrophobic polypropylene, etc.; a sheet or a non-woven fabric obtained by using glass fiber, polyethylene, or the like, may be used. When a solid electrolyte such as a polymer is used as an electrolyte, the solid electrolyte may also function as the separator. Preferably, a polyethylene film, a polypropylene film, or a multi-layered film obtained by combining the films, or a polymer film for a polymer electrolyte or a gel-type polymer electrolyte such as polyvinylidene fluoride, polyethylene oxide, polyacrylonitrile, or polyvinylidene fluoride hexafluoropropylene copolymer, may be used.

Hereinafter, an electrochemical device in which the electrode assembly 100 according to the present invention may be applicable, will be explained.

The electrode assembly 100 according to the present invention may be applied in an electrochemical cell producing electricity through the electrochemical reaction of a cathode and an anode. Typical examples of the electrochemical cell include a super capacitor, an ultra capacitor, a secondary battery, a fuel cell, all sorts of sensors, an apparatus for electrolysis, an electrochemical reactor, and the like. The secondary battery is particularly preferred.

The secondary battery has a structure in which a chargeable/dischargeable electrode assembly having an impregnated state with an ion-containing electrolyte is built in a battery case. In a preferred embodiment, the secondary battery may be a lithium secondary battery.

Recently, a lithium secondary battery attracts much concern as for a power source of a large size device as well as a small size mobile device. A light weight lithium secondary battery may be preferred for applying thereof in these fields. As one method of decreasing the weight of the secondary battery, a built-in structure including an electrode assembly in a pouch-type case of an aluminum laminate sheet may be used. Since the features on the lithium secondary battery are well known in this art, the explanation on the lithium secondary battery will be omitted.

In addition, as described above, when the lithium secondary battery is used as the power source of a medium and large size device, a secondary battery maximally restraining the deterioration of an operating performance for a long time, having good lifetime properties and having a structure possibly being mass-produced with a lower cost, may be preferred. From this point of view, the secondary battery including the electrode assembly of the present invention may be preferably used as a unit battery in a medium and large size battery module.

A battery pack including a battery module including a plurality of secondary batteries may be used as a power source in at least one medium and large size device selected from the group consisting of a power tool; an electric vehicle selected from the group consisting of an electric vehicle (EV), a hybrid electric vehicle (HEV), and a plug-in hybrid electric vehicle (PHEV); an E-bike; an E-scooter; an electric golf cart; an electric truck; and an electric commercial vehicle.

The medium and large size battery module is constituted of a plurality of unit batteries connected in a serial system or a serial/parallel system so as to provide a high output and high capacity. The techniques on these features are well known in this art. Thus, the explanation on the features will be omitted in this application.

While the present invention has been shown and described in connection with the exemplary embodiments, it will be apparent to those skilled in the art that modifications and variations can be made without departing from the spirit and scope of the invention as defined by the appended claims.

EXPLANATION ON REFERENCE NUMERALS

110: Second separator
120: Cathode
130: First separator
140: First anode
150: Separator
160: Cathode
170: Separator
180: Second anode

What is claimed is:

1. A fabricating method of an electrode assembly comprising a first electrode, a second electrode and a separator, a unit structure of the electrode assembly being manufactured by:
   conducting a first process of laminating and forming a bicell having a first electrode/separator/second electrode/separator/first electrode structure; and
   conducting a second process of laminating first separator/second electrode/second separator one by one on one of the first electrode among two of the first electrodes,
   wherein a temperature applied for the laminating in the second process is lower by 20° C. to 50° C. than a temperature applied for the laminating in the first process.

2. The fabricating method of an electrode assembly of claim 1, wherein a plurality of the unit structures are stacked.

3. The fabricating method of an electrode assembly of claim 1, wherein the first process and the second process are conducted as a continuous process.

4. The fabricating method of an electrode assembly of claim 1, wherein both sides of the first separator are coated with a coating material having adhesiveness, and one side of the second separator making a contact with the second electrode is coated with the coating material having adhesiveness.

5. The fabricating method of an electrode assembly of claim 4, wherein the coating material is a mixture of inorganic particles and a binder polymer.

6. The fabricating method of an electrode assembly of claim 1, wherein both sides of the separator included in the bicell are coated with a coating material having adhesiveness.

7. The fabricating method of an electrode assembly of claim 6, wherein the coating material is a mixture of inorganic particles and a binder polymer.

8. The fabricating method of an electrode assembly of claim 1, wherein the first electrode and the second electrode are double sided electrodes comprising a coated structure on both sides of a current collector with an active material.

9. The fabricating method of an electrode assembly of claim 1, wherein a pressure applied for the laminating in the second process is 40% to 60% of a pressure applied for the laminating in the first process.

10. The fabricating method of an electrode assembly of claim 1, wherein a temperature applied to an upper block and a lower block of a laminator for conducting the second process is different by 10° C. to 30° C.

* * * * *